UNITED STATES PATENT OFFICE.

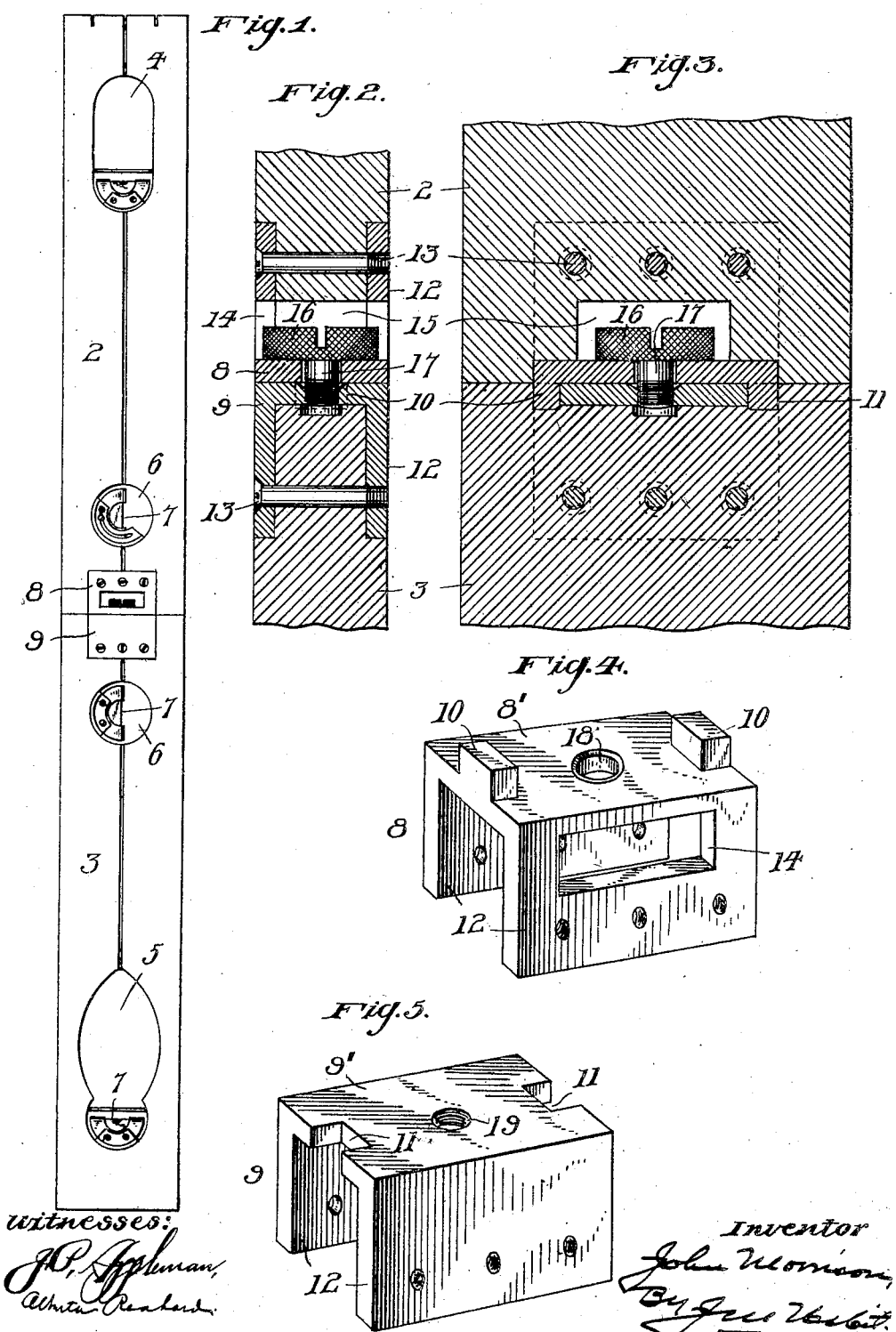

JOHN MORRISON, OF PITTSBURG, PENNSYLVANIA.

PLUMB RULE AND LEVEL.

No. 891,182.  Specification of Letters Patent.  Patented June 16, 1908.

Application filed January 31, 1908. Serial No. 413,546.

*To all whom it may concern:*

Be it known that I, JOHN MORRISON, a resident of Pittsburg, in the county of Allegheny and State of Pennsylvania, have invented certain new and useful Improvements in Plumb Rules and Levels, of which the following is a specification.

This invention relates to plumb rules and levels formed in sections which may be readily taken apart or folded and thus put in convenient form for carrying, or for packing in a kit, chest or other inclosure.

The primary object is to provide a joint of simple and improved construction for holding the sections in accurate alinement with each other, with clamping means which may be readily and conveniently manipulated for either securing or releasing the joint.

In the accompanying drawings Figure 1 is a face view of a plumb rule and level provided with the improved joint. Figs. 2 and 3 are sectional detail views. Figs. 4 and 5 are perspective views of the joint parts.

The rule here illustrated is formed in two sections 2 and 3 of equal length, the upper section having the usual handhold 4 near its upper end, while in the lower section is the familiar plumb-bob cavity 5. Each of cavities 4 and 5, and intermediate cavities 6, may be equipped with spirit leveling glasses 7. No novelty is claimed for the structures thus far referred to, and while I illustrate a two-section rule, the invention may be applied to an instrument formed in any desired number of sections.

The joint for securing together the meeting ends of the rule sections consists of two castings 8 and 9 which are mortised into the end and side faces of the rule sections or stock so as to be flush therewith. In the preferred arrangement, the upper portion of the joint, or that part secured to section 2, carries projections 10 which enter depressions 11 in joint part 9 secured to the lower section of the rule. The flat side faces 12 of each member embrace the stock sufficiently to obtain a solid seat and a firm hold, with screws 13 extending from one side face through the stock and tapped into the opposite face, the hold being tightened whenever necessary by simply turning up the screws.

The end faces 8' 9' of the joint parts bear flatly against each other, and with projections 10 entered in the cavities 11 of the other part the accurate alinement of the rule sections is always assured. Projections 10 are preferably arranged at the opposite ends of the joint member 8 so that cavities 11 in the other member may be in the form of notches extending inwardly from the opposite ends thereof.

For clamping the members together the opposite faces 12 of the upper member 8 are slotted or recessed at 14, and the end of the stock is correspondingly cut out at 15 to form a cavity for the milled and slotted head 16 of the short screw 17. This screw extends loosely through a central aperture 18 in face 8' of joint section 8 and enters the thread aperture 19 in face 9' of member 9. While the screw head is wholly within the lines of the rule and thus fully protected, it is at the same time conveniently accessible for manipulation by the user, either with his fingers, or with a nail, screwdriver, or other device entered in one of the head slots for turning the screw. At the same time, the screw and its head are confined within the cavity and can not work out even when the rule sections are disconnected.

The joint parts are of such form that they may be readily cast of brass or other suitable metal, and the coöperating projections and recesses at opposite sides of the clamping screw hold the parts together with absolute accuracy. It will be noted that the joint does not extend to either of the longitudinal edges of the rule, and hence the latter may be planed or dressed without interference and as is necessary at intervals for truing the level.

While designed primarily for sectional plumb-rules and levels, the joint may be used for connecting other parts or objects and may be dealt in commercially, like hinges and other hardware, to be used wherever required.

I claim:—

1. The combination with sections of a plumb rule and level, of joint members secured to adjacent ends thereof with one of said members extended beyond the end of its rule section and the other member recessed to receive such extension, and a clamping screw extending longitudinally of the rule for securing together said sections.

2. The combination with sections of a plumb rule and level, of two joint members secured to the adjacent ends of the sections, each member consisting of an end part which bears against the end part of the other member and separated side parts which embrace the end portion of the rule section, the meeting faces of the joint members being formed one with projections and the other with recesses to receive the projections, and a clamping screw extending through the meeting faces of the members for uniting the same.

3. The combination with the sections of a plumb rule and level, of a joint formed in two parts secured to the meeting ends of the rule sections, one of the joint members having a transverse recess adjacent the meeting faces of the members and with alining screw apertures in said meeting faces, and a clamping screw having a head confined in said transverse recess.

4. The combination with the sections of a plumb rule and level, of a joint formed in two parts and secured to the abutting ends of the rule sections and with the joint members formed with surfaces which bear one against the other, one of said surfaces having separated recesses, projections on the other of said surfaces complementary with said recesses, and a clamping screw located between the separated projections and recesses and disposed longitudinally of the rule and extending through said meeting surfaces.

5. The combination with the sections of a plumb rule and level, of a joint formed in two parts and secured to the adjacent ends of the rule sections, each part having an end face which bears against the corresponding face of the other part, each part also formed with separated side faces which embrace the rule sections respectively, the separated side faces of one part having openings formed opposite each other and with the material of the rule section removed between said openings to form a cavity, a clamping screw in the cavity, screw apertures in the meeting faces of the joint parts, and projections at the opposite ends of the meeting face of one joint part fitting corresponding recesses in the opposite ends of the meeting face of the other joint part.

6. A joint formed in two parts having abutting end faces and each part having separated side faces, the side faces of one part recessed to form a screw cavity with a screw aperture extending from said cavity through the abutting faces, and a clamping screw operative within the screw cavity and said aperture, the joint parts having interlocking projections and recesses in said abutting faces.

In testimony whereof I affix my signature in presence of two witnesses.

JOHN MORRISON.

Witnesses:
   J. M. NESBIT,
   JNO. J. FITZGERALD.